Sept. 13, 1932. H. W. RUPPLE 1,877,056
AUTOMATIC REVERSE FOR THREADING TOOLS
Filed Aug. 17, 1931 2 Sheets-Sheet 1

INVENTOR:
HARRY W. RUPPLE
BY Kwis Hudson & Kent.
ATTORNEYS.

Patented Sept. 13, 1932

1,877,056

UNITED STATES PATENT OFFICE

HARRY W. RUPPLE, OF CLEVELAND, OHIO, ASSIGNOR TO THE CLEVELAND AUTOMATIC MACHINE COMPANY, A CORPORATION OF OHIO

AUTOMATIC REVERSE FOR THREADING TOOLS

Application filed August 17, 1931. Serial No. 557,572.

This invention relates to an automatic metal working machine and more particularly to the threading mechanism thereof or a threading attachment therefor.

The invention is particularly applicable to multiple spindle automatic machines wherein a plurality of work blanks are supported in rotatable spindles carried in an indexible spindle turret, and a number of forming tools carried on a reciprocating tool slide engage the several blanks during a single reciprocation of the tool slide, but may be applied to other types of machine tools without changing the principle of operation and construction.

In machines of this general type, the threading tool is usually carried in a floating tool holder rotated in the same direction at different speeds to produce the feeding and return movements. When a bottoming tap etc. is being used it is essential that the change of speed together with the return movement of the tool take place at the instant the tap reaches the bottom of the hole to prevent injury to the tool.

It is an object of this invention to provide mechanism which will change the speed of rotation of a threading tool and start the return movement at a predetermined time, such as a bottoming tap at the instant it reaches the bottom of the hole.

Another object of the invention is the production of a mechanism for stopping the advance of a tool and initiating the return movement thereof at a predetermined time which will be positive in operation and simple in construction, and which will operate even though the main feed of the machine has been thrown out or stopped.

Another object of the invention is the production of an attachment adapted to be applied to the threading mechanism of well known automatic machines which will change the speed and reverse the feed of the tool at a predetermined time and independent of the main feed.

Other objects and advantages of the invention will be apparent to those skilled in the art from the following description of the preferred embodiment of the invention described in connection with the accompanying drawings, in which—

Figure 1:
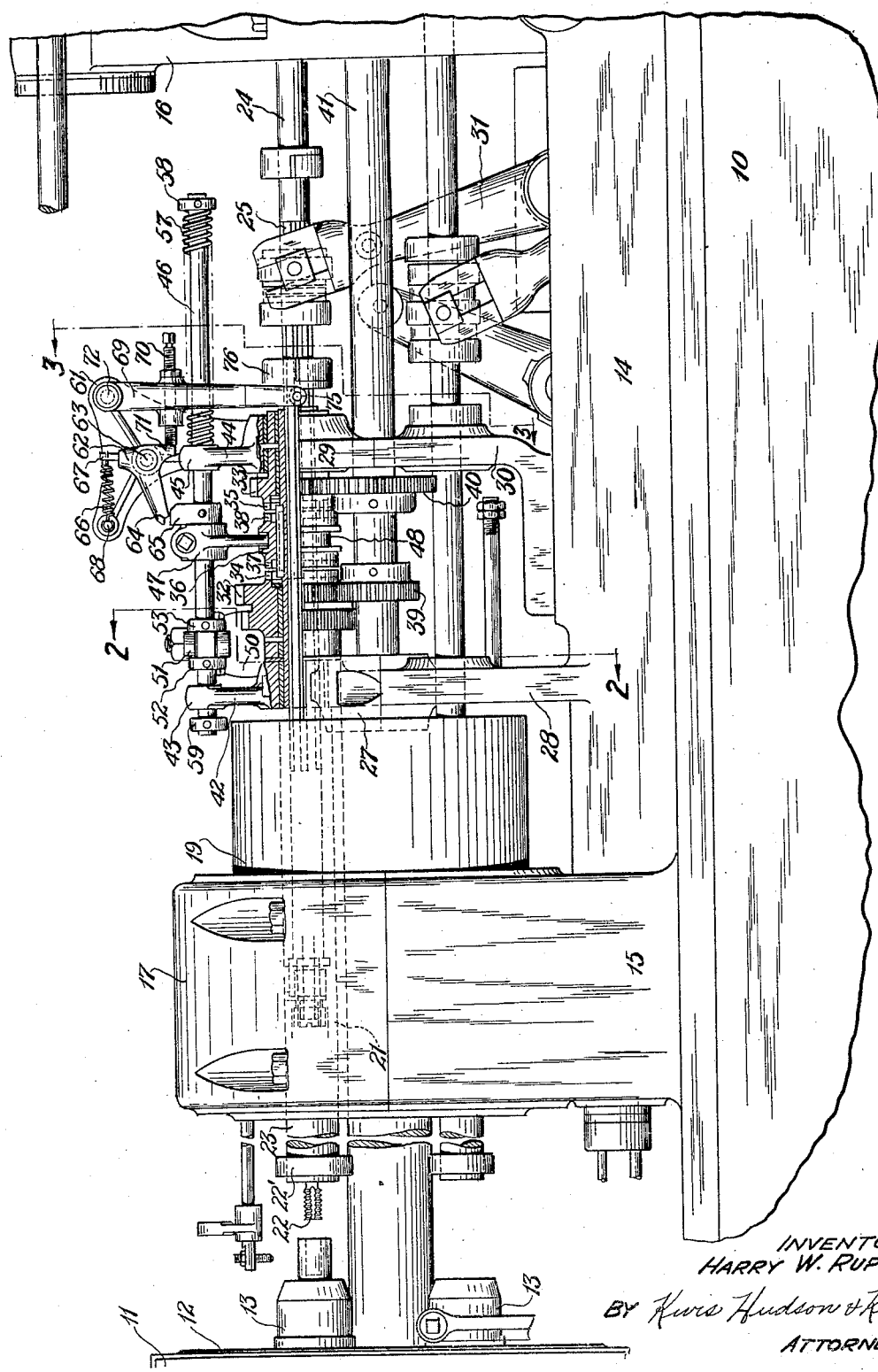
Fig. 1 is a front elevational view, with parts in section, of the tool slide end of an automatic machine equipped with automatic reverse mechanism for the threading tool.

In the drawings and the specification, the preferred form of the invention is shown as applied to the threading equipment of a multi-spindle automatic machine, but the machine per se forms no part of the present invention and is shown merely for illustration purposes.

The bed plate and main frame of the machine is indicated at 10. The lefthand end, as viewed in Fig. 1, of the bed plate, not shown, supports the spindle turret housing 11 which carries therein a rotatable spindle turret 12 provided with indexing mechanism, as is well known in the art. The spindle turret carries a plurality of rotatable work holding spindles 13. On the end of the bed plate shown in Fig. 1 and opposite the spindle turret housing is mounted an elongated member 14 provided at the end adjacent the spindle turret housing with an enlarged raised boss 15 and at the other end with a bracket 16. The boss 15 is provided with a cap member 17 and a central longitudinal bore 18 in which is slidably mounted a tool carrying member or slide 19. The tool slide 19 carries a plurality of tools and is reciprocated in the boss 15 by suitable mechanism driven in timed relation to a main cam shaft 20 extending along the rear of the machine (Fig. 2), in a manner well known in the art.

The tool turret is provided with a plurality of longitudinal apertures 21 in coaxial alignment with the spindles 13, each of which is called a station. In the illustration shown, the thread cutting tool 22 is mounted in a floating tool holder 22′ carried in the upper rear station and the tools, etc. located at the other stations will not be described as they form no part of the present invention.

A tool holding member 23 which carries the floating tool holder 22' is rotatably and slidably mounted in the upper rear aperture mentioned above in the tool slide 19. A shaft 24 provided with a splined section 25 is attached to the end of the member 23 opposite to that which carries the tool, as shown in dotted lines in Fig. 1 and together with the member attached thereto constitutes the tool spindle. The splined section 25 of the shaft 24 is in engagement with splines on the interior of a tubular member 26 rotatably mounted at the lefthand end as viewed in Fig. 1, in a cap member 27 carried on an upwardly extending projection 28 of the member 14 and at the other end in a cap member 29 carried on a bracket 30 attached in any suitable manner to the member 14.

Figure 2:
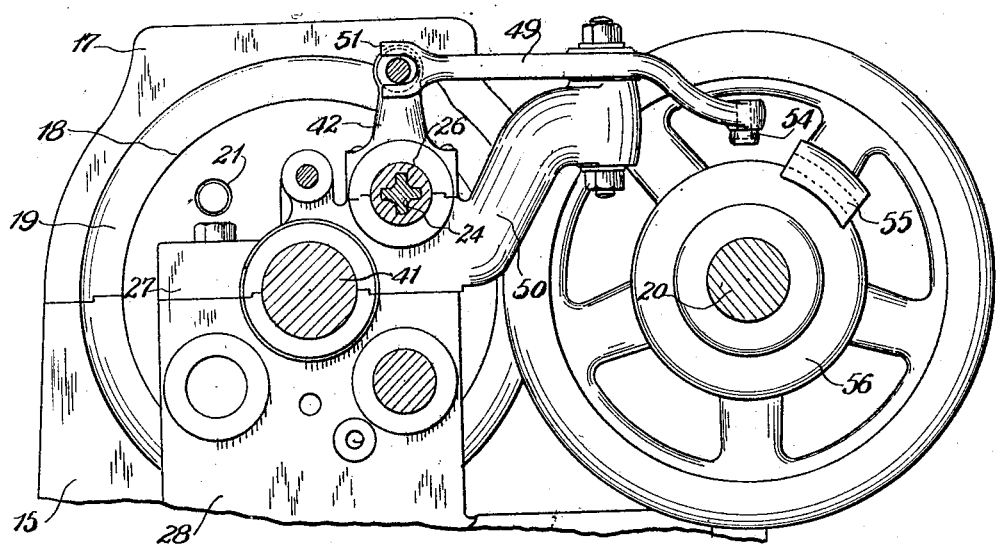
Fig. 2 is a sectional view taken on the line 2—2 of Fig. 1.

The shaft 24 is adapted to be reciprocated by the arm 31 actuated from the main cam shaft of the machine, as is well known in the art, and is adapted to be rotated through gears 32 and 33 rotatably suported by suitable bearings on the tubular member 26. The gears 32 and 33 are provided with clutch teeth 34 and 35 respectively on adjacent sides of the hubs thereof. A collar 36 slidably keyed to the tubular member 26 between the gears 32 and 33 as shown in Fig. 1, is provided at opposite ends with clutch teeth 37 and 38 adapted to engage with the clutch teeth 34 and 35 on the gears 32 and 33 respectively. The gears 32 and 33 are in mesh with and are driven from gears 39 and 40 mounted on the main shaft 41 of the machine driven from an electric motor or any suitable means not shown.

The mechanism described so far is well known in the art and the details of construction will be found to vary within wide limits and does not directly form a part of this invention, which relates more particularly to the mechanism described below for shifting the clutch element 36 to change the speed of the shaft 24.

The cap member 27 is provided with an arm 42 carrying a boss 43 as shown in Fig. 1. The cap member 29 carries a projection 44 provided with a boss 45 similar to the boss 43. A rod 46 slidably supported in the bosses 43 and 45 carries a collar 47 adjustable thereon. The collar 47 has a yoke extending therefrom which engages within a circular groove 48 in the clutch element 36. The construction is such that the clutch element is engaged and disengaged with the clutch teeth on gear 32 or 33 as the rod 46 is shifted to the right or left as viewed in Fig. 1.

The rod 46 is shifted to the left by an arm 49 pivotally mounted on an extension 50 of the cap member 27. A yoke 51 formed on one end of the arm 59 engages between two collars 52 and 53 on the rod 49 and a cam roller 54 carried by the other end of said arm engages in a cam track 55 adjustably secured to a cam wheel 56 carried by the main cam shaft 20. Engagement of the cam roller 54 with the cam track 55 moves the arm 49 in such a direction that the rod 46 is moved to engage the clutch teeth 34 and 37 which in this instance is the low speed drive for the tool spindle and tool holder 22'.

The rod 46 is shifted so as to engage the clutch teeth 35 and 38 and drive the tool holder at its high speed by means of the spring 57 mounted on one end of said rod and compressed between the boss 45 and a collar 58 adjustably mounted on the rod. The movement of the rod in this direction is limited by the engagement of clutch teeth 35 and 38 and a collar 59 adjustably mounted on the other end of the rod.

The following mechanism is provided for holding the rod 46 in the left-hand position as viewed in Fig. 1, with the clutch teeth 34 and 37 engaged and the spring 57 compressed, and to release said rod upon a predetermined advance of the tool holder and tool permitting the spring 57 to shift the rod 46 together with the clutch element to the right and engage the clutch teeth 35 and 38. A cap member 60 mounted on the rear part of the cap member 29 is provided with an upwardly extending projection 61. A catch 62 pivotally mounted on a pin 63 carried by said projection is provided with an end 64 adapted, while the catch is in one position, to engage against a member 65 mounted on the rod 46 and prevent movement of said rod under the action of the spring 57. The catch 62 is held in its engaged position by a spring 66 attached to a pin 67 projecting therefrom and a pin 68 carried in the projection 61.

Figure 3:
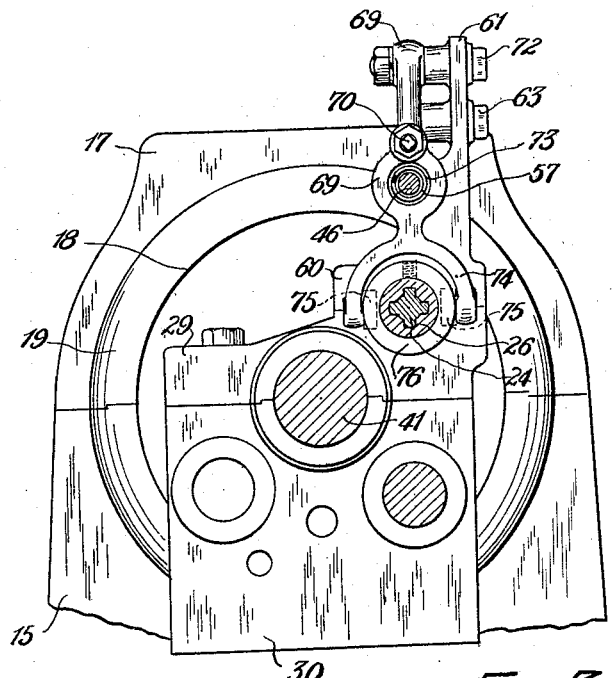
Fig. 3 is a sectional view taken on the line 3—3 of Fig. 1.

A lever 69 pivotally mounted on a bolt 72 carried on the projection 61 is provided with an adjustable stop screw 70 adapted to engage a projection 71 on the catch 62. The lever 69 is provided at about the center thereof with an opening 73 through which the rod 46 and the spring 57 project. The opening 73 is large enough to permit free movement of the lever 69 without interference with said rod and spring. The lower end of the lever 69 is provided with a yoke 74 carrying small rollers 75 at the lower ends thereof adapted to engage the rear side of a collar 76 adjustably mounted on the shaft 24 (see Fig. 3).

The operation of the device is as follows: Assuming that the machine is in operation with the tool cutting, the parts are in the following relative positions. The clutch element 36 is in the left position as viewed in Fig. 1 and held in that position with the spring 57 compressed by the abutment of the end 64 of the catch 62 against the collar 65. The shaft 24 together with the tool holder and tool are moving into the work under the action of the threading tool carried in the floating tool holder and the lever 31 and are being rotated at the slow speed by the shaft 41 through the gears 39 and 32, the clutch teeth 34, 37 and the tubular member 26. When the tap has reached the bottom of the hole, due to a predetermined setting of the collar 76, the lever 69 is rotated in a clockwise direction, as viewed in Fig. 1, by the abutment of the collar 76 against the rollers 75. This movement of the lever 69 causes the stop screw 70 to move the catch 62 about the pin 63 and the end 64 of said catch clear of the collar 65, thus releasing the spring 57 and permitting it to shift the clutch element 36 to the right and engage the clutch teeth 38 and 35. The tool holder is then rotated at high speed through the gears 40 and 33 and the return movement of said tool initiated. After the tool has been returned to its retracted position and a new cycle of operation is starting, the cam track 55 on the cam wheel 56 engages the roller 54 and moves the rod 46, together with the clutch element 36, to the left, again engaging the clutch teeth 34 and 37 effecting the slow rotary movement of the tool holder. The spring is again compressed and, together with the clutch, is held in the position indicated by the catch 62.

From the foregoing disclosure, it will be apparent that I have produced a device which will change the speed and reverse the feed of a thread cutting tool at a predetermined time without being affected by wear and lost motion or by the stopping or throwing out of the feed while the tool is cutting or reversing thus eliminating breakage of tools, as is characteristic of devices now known in the art. It will be understood that I do not intend to be restricted or limited to the specific construction shown and described herein, but any variations in construction are contemplated which fall within the invention as defined by the following claims.

Having thus described my invention, I claim:

1. In a machine of the character described, the combination of a frame, a work holder supported thereby, a tool spindle supported by said frame, means for reciprocating said spindle, means for rotating said spindle at different speeds, clutch means for controlling the speed of rotation of said member, resilient means for engaging the clutch in one direction, holding means for holding said resilient means inoperative, and a member pivotally supported by said frame and adapted to be operated by the tool spindle for releasing said resilient means upon predetermined movement of said spindle permitting it to shift said clutch.

2. In a machine of the character described, the combination of a frame, a spindle adapted to carry a tool, means for reciprocating said spindle, means including a clutch for rotating said spindle at different speeds, a slidable rod operatively connected to said clutch for changing the speed of rotation of said spindle, a cam operated lever pivoted on said frame for moving said rod in one direction, a resilient means for moving said rod in the other direction, a catch pivoted on said frame adapted to engage a part of said rod when in one position, a lever pivotally supported by said frame and provided with an adjustable stop engageable with said catch, and means on said spindle adapted to engage and move said lever whereby said resilient means is released to operate said catch.

3. In a machine of the character described, the combination of a frame, a tool carrying member including a shaft, a lever pivotally connected to said shaft for reciprocating the same, a rotatable sleeve splined on said shaft, two gears rotatably mounted on said sleeve and provided with clutch teeth on their adjacent sides, means for driving said gears at different speeds, a slidable clutch member keyed on said sleeve and provided with clutch teeth adapted to engage the clutch teeth on said gears, a rod slidably mounted in said frame, an arm mounted on said rod engaging the slidable clutch member, a lever for moving the rod in one direction, a resilient means for moving said rod in the other direction, a catch pivoted on said frame and adapted to engage a member carried on said rod and prevent operation of said spring after the rod has been moved by said lever, an arm pivoted on said frame, an adjustable screw on said arm adapted to engage said catch and move it to an inoperative position, and a collar on said shaft adapted to engage said arm and move the same about its pivot.

In testimony whereof, I hereunto affix my signature.

HARRY W. RUPPLE.